United States Patent
Mizuno et al.

(10) Patent No.: US 7,360,777 B2
(45) Date of Patent: Apr. 22, 2008

(54) VEHICLE SUSPENSION SYSTEM

(75) Inventors: Kazuyuki Mizuno, Nishikamo-gun (JP); Masaki Kanatani, Okazaki (JP); Hidenori Kajino, Toyota (JP); Motohiko Honma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 126 days.

(21) Appl. No.: 11/281,564

(22) Filed: Nov. 18, 2005

(65) Prior Publication Data
US 2006/0119064 A1    Jun. 8, 2006

(30) Foreign Application Priority Data
Dec. 3, 2004    (JP) .............................. 2004-351155

(51) Int. Cl.
*B60G 9/04*    (2006.01)
(52) U.S. Cl. .................. 280/124.157; 280/124.16; 280/5.506
(58) Field of Classification Search ......... 280/124.104, 280/124.105, 124.125, 124.157, 124.158, 280/124.159, 124.16, 124.161, 5.504, 5.506, 280/5.507, 5.508, 5.512, 5.513, 5.515
See application file for complete search history.

(56) References Cited
U.S. PATENT DOCUMENTS

| | | | | |
|---|---|---|---|---|
| 2,184,202 A | * | 12/1939 | Tschanz .................. | 280/5.506 |
| 3,024,037 A | | 3/1962 | Fiala et al. | |
| 3,752,497 A | | 8/1973 | Enke et al. | |
| 3,778,081 A | * | 12/1973 | Takahashi et al. ....... | 280/5.509 |
| 3,895,816 A | * | 7/1975 | Takahashi et al. ....... | 280/5.503 |
| 4,371,182 A | * | 2/1983 | Brown ...................... | 280/6.16 |
| 5,401,053 A | * | 3/1995 | Sahm et al. ............. | 280/5.502 |
| 5,785,344 A | * | 7/1998 | Vandewal et al. ....... | 267/64.16 |
| 6,942,230 B1 | * | 9/2005 | Fontdecaba Buj ... | 280/124.104 |

FOREIGN PATENT DOCUMENTS

FR    2 112 232    6/1972

* cited by examiner

*Primary Examiner*—Paul N. Dickson
*Assistant Examiner*—Tiffany L. Webb
(74) *Attorney, Agent, or Firm*—Oliff & Berridge, PLC (57) ABSTRACT

A vehicle suspension system for a vehicle, including: (a) a plurality of suspension cylinders each disposed between a chassis-side member and a corresponding one of a plurality of wheel-side members; (b) a controller cylinder including a housing and at least one piston slidably mounted in the housing, such that the housing and the at least one piston cooperate to define a plurality of chambers each having a volume that is variable upon slide movement of the at least one piston relative to the housing; (c) individual conduits each communicating a corresponding one of the plurality of chambers of the controller cylinder and a chamber of a corresponding one of the plurality of suspension cylinders; and (d) a suspension-cylinder operation facilitator operable to facilitate an operation of each of the plurality of suspension cylinders for permitting displacement of each of the plurality of wheel-side members relative to the chassis-side member after the at least one piston of the controller cylinder has reached its stroke end.

9 Claims, 8 Drawing Sheets

VEHICLE SUSPENSION SYSTEM

This application is based on Japanese Patent Application No. 2004-351155 filed in Dec. 3, 2004, the content of which is incorporated hereinto by reference.

BACKGROUND OF THE INVENTION

Field of the Invention

The present invention relates in general to a vehicle suspension system, and more particularly to such a vehicle suspension system including: a plurality of suspension cylinders each disposed between a vehicle chassis and a corresponding one of a plurality of axles carrying wheels; and a controller cylinder connected to the suspension cylinders via respective conduits.

U.S. Pat. No. 3,024,037 discloses an example of such a vehicle suspension system: including four suspension cylinders each disposed between a corresponding one of chassis-side members connected to a vehicle chassis and a corresponding one of wheel-side members connected to axles carrying respective wheels; and a controller cylinder defining four chambers that are held in communication with chambers of the respective four suspension cylinders through respective individual conduits. The controller cylinder has a housing whose inside space is divided by a partition wall into two spaces. Two pistons are fluid-tightly and slidably disposed within the respective two spaces that are divided by the partition wall, and are integrally connected to each other by a connection rod that is fluid-tightly and slidably fitted in a through-hole of the partition wall. In spite of its simple construction, in the event where one of the wheels runs over a raised portion of a roadway surface, and in the event of so-called "in-phase movement of diagonally opposite wheels" in which diagonally opposite two of the wheels are simultaneously moved in the same direction upwardly or downwardly, the vehicle suspension system is capable of permitting smooth movement of the wheel or wheels in question in the upward or downward direction, while suitably restraining rolling and pitching motions of the vehicle body, thereby establishing an improved comfortability in riding on the vehicle. It is noted that, in the following description including "DETAILED DESCRIPTION OF THE PREFERRED EMBODIMENTS", a plurality of pistons such as the above-described two pistons integrally connected by the connection rod will be referred to as "piston assembly".

In the vehicle suspension system disclosed in the U.S. patent publication, the controller cylinder has to have a large size, since each of the four chambers defined by the controller cylinder is required to have a capacity for permitting a corresponding one of the four suspension cylinders to be activated as needed. That is, each chamber has to have a capacity large enough to receive a working fluid that is to be discharged from the corresponding suspension cylinder, and to store the working fluid that is to be supplied to the corresponding suspension cylinder. The large-sized controller cylinder leads to a difficulty in its installation on the vehicle and an increase in weight of the vehicle, resulting in an increased cost for manufacturing the vehicle.

While there has been described a problem encountered in a case where the controller cylinder has four chambers, the same problem is suffered in a case where the controller cylinder has two chambers, too. Further, the same thing can be said in a case where the controller cylinder has three or five or more chambers which include, in addition to chambers communicated with the chambers of the suspension cylinders, a chamber for generating a control force acting on the piston assembly.

SUMMARY OF THE INVENTION

The present invention was made in the light of the background art discussed above. It is therefore an object of the present invention to provide a vehicle suspension system made compact in size. This object may be achieved according to the principle of this invention, which provides a vehicle suspension system for a vehicle having a chassis and axles that carry wheels, the system including: (a) a plurality of suspension cylinders each disposed between a chassis-side member connected to the chassis and a corresponding one of a plurality of wheel-side members connected to the axles carrying the wheels; (b) a controller cylinder including a housing and at least one piston slidably mounted in the housing, such that the housing and the at least one piston cooperate to define a plurality of chambers each having a volume that is variable upon slide movement of the at least one piston relative to the housing; (c) individual conduits each communicating a corresponding one of the plurality of chambers of the controller cylinder and a chamber of a corresponding one of the plurality of suspension cylinders; and (d) a suspension-cylinder operation facilitator operable to facilitate an operation of each of the plurality of suspension cylinders for permitting displacement of each of the plurality of wheel-side members relative to the chassis-side member after the at least one piston of the controller cylinder has reached a stroke end thereof.

In the present vehicle suspension system constructed as described above, the controller cylinder can be made more compact in size, than in a conventional vehicle suspension system in which the controller cylinder is adapted to be capable of permitting flow of the working fluid into or out of the controller cylinder during movement of the piston of the suspension cylinder within its stroke range. If the piston of the controller cylinder reaches its stroke end during movement of the piston of the suspension cylinder, for example, in the event where one of the wheels runs over a raised portion of a roadway surface, and in the event of "in-phase movement of diagonally opposite wheels" in which diagonally opposite two of the wheels are simultaneously moved in the same direction upwardly or downwardly, the controller cylinder can not achieve its function of permitting a smooth vertical movement of each of the wheels, thereby deteriorating the ride comfort. For avoiding such a problem, the controller cylinder is inevitably given a large size in a conventional suspension system. However, in the suspension system according to the invention, owing to the provision of the suspension-cylinder operation facilitator, each suspension cylinder can continue its smooth operation even after the piston of the controller cylinder has reached its stroke end, thereby making it possible to restraining deterioration of the ride comfort.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
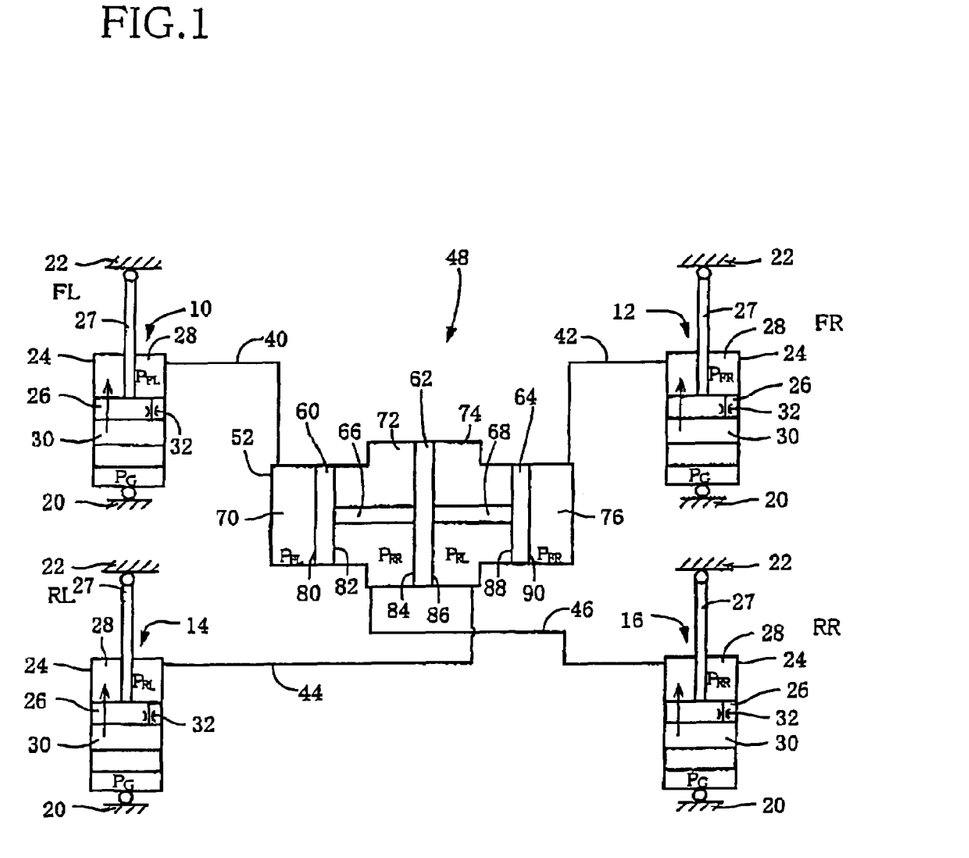
FIG. 1 is a schematic view showing a vehicle suspension system constructed according to a first embodiment of this invention.

Referring first to FIGS. 1-4, there will be described in detail a vehicle suspension system constructed according to a first embodiment of the invention. As shown in FIG. 1, the vehicle suspension system for a vehicle includes a plurality of suspension cylinders in the form of shock absorbers 10, 12, 14, 16 which are provided for respective front left and right and rear left and right wheels. Each of these four shock absorbers 10, 12, 14, 16 is interposed between a wheel-side member 20 (connected to an axle carrying a corresponding one of the wheels) and a chassis-side member 22 (connected to a chassis of the vehicle), and includes a housing 24 and a piston 26 fluid-tightly and slidably fitted in the housing 24. In the present embodiment, the housing 24 is attached to the wheel-side member 20, while a piston rod 27 extending from the piston 26 and protruding out of the housing 24 is attached to the chassis-side member 22. The piston 26 cooperates with the housing 24 to define two hydraulic chambers 28, 30 formed on respective opposite sides of the piston 26, and has a fluid passage for fluid communication between the two hydraulic chambers 28, 30. This fluid passage is provided with a flow restrictor or throttle 32, which restricts a flow of a hydraulic working fluid between the two hydraulic chambers 28, 30, and thereby restrict a speed of movement of the piston 26 relative to the housing 24, so that the shock absorber 10, 12, 14, 16 provides a damping force according to the restricted speed of the relative movement of the piston 26 and housing 24. It is noted that, although the flow restrictor 32 is illustrated in FIG. 1 as if it consisted of a single fixed restrictor having a predetermined constant resistance to flows of the fluid therethrough, the flow restrictor 32 is actually constituted by combination of the fixed restrictor and at least one valve, such that the damping force provided by the shock absorber 10, 12, 14, 16 is made larger when the shock absorber expands, than when the shock absorber contracts.

The four shock absorbers 10-16 are connected to a controller cylinder 48 through respective individual conduits 40, 42, 44, 46. The controller cylinder 48 includes a piston assembly 50 including three pistons connected to each other, and a cylinder housing 52 in which the piston assembly 50 is fluid-tightly and slidably fitted. The three pistons of the piston assembly 50 consist of a first piston 60, a second piston 62 and a third piston 64, which are arranged in series with each other in this order of description in a right direction as seen in FIG. 1, in an axial direction of the controller cylinder 48. The piston assembly 50 of the controller cylinder 48 further includes a connection rod 66 connecting the first and second pistons 60, 62, and a connection rod 68 connecting the second and third pistons 62, 64. Thus, the three pistons 60, 62, 64 and the two connection rods 66, 68 are connected in series with each other to constitute the piston assembly 50.

The cylinder housing 52 has a stepped cylinder bore consisting of a central large-diameter portion, and two small-diameter portions which are formed adjacent to the respective opposite axial ends of the central large-diameter portion and which have a smaller diameter than the large-diameter portion. The piston assembly 50 is received in this stepped bore of the cylinder housing 52, such that the piston assembly 50 cooperates with the stepped bore to define four hydraulic chambers: a first hydraulic chamber 70 formed on one side of the first piston 60 which is remote from the second piston 62; a second hydraulic chamber 72 formed between the first and second pistons 60, 62; a third hydraulic chamber 74 formed between the second and third pistons 62, 64; and a fourth hydraulic chamber 76 formed on one side of the third piston 64 which is remote from the second piston 62. The first piston 60 has an outer pressure-receiving surface 80 partially defining an outer hydraulic chamber in the form of the first hydraulic chamber 70, and an inner pressure-receiving surface 82 partially defining an inner hydraulic chamber in the form of the second pressure chamber 72. The second piston 62 has an inner pressure-receiving surface 84 partially defining the second hydraulic chamber 72, and an inner pressure-receiving surface 86 partially defining an inner hydraulic chamber in the form of the third hydraulic chamber 74. The third piston 64 has an inner pressure-receiving surface 88 partially defining the third hydraulic chamber 74, and an outer pressure-receiving surface 90 partially defining an outer hydraulic chamber in the form of the fourth hydraulic chamber 76.

The first hydraulic chamber 70 is connected through the individual conduit 40 to the hydraulic chamber 28 of the shock absorber 10 for the front left wheel, so that the outer pressure-receiving surface 80 receives a hydraulic pressure in the hydraulic chamber 28 of the shock absorber 10. The fourth hydraulic chamber 76 is connected through the individual conduit 42 to the hydraulic chamber 28 of the shock absorber 12 for the front right wheel, so that the outer pressure-receiving surface 90 receives a hydraulic pressure in the hydraulic chamber 28 of the shock absorber 12. In the present embodiment, the first and third pistons 60, 64 have the same diameter, and the outer pressure-receiving surfaces 80, 90 have the same pressure-receiving surface area.

The second hydraulic chamber 72 formed between the adjacent first and second pistons 60, 62 is connected through the individual conduit 46 to the hydraulic chamber 28 of the shock absorber 16 for the rear right wheel, and the opposed two inner pressure-receiving surfaces 82, 84 of the first and second pistons 60, 62 receive a hydraulic pressure in the shock absorber 16. A force based on the hydraulic pressure acting on the inner pressure-receiving surface 82 of the first piston 60 having a smaller diameter than the second piston 62 acts in the left direction as seen FIG. 1, while a force based on the hydraulic pressure acting on the inner pressure-receiving surface 84 of the second piston 62 acts in the right direction. Therefore, the second hydraulic chamber 72 of the piston assembly 50 has an effective pressure-receiving surface area which receives the hydraulic pressure acting on the piston assembly 50 in the right direction and which is equal to the area of the pressure-receiving surface 84 of the second piston 62 minus the area of the pressure-receiving surface 82 of the first piston 60.

The third hydraulic chamber 74 formed between the adjacent second and third pistons 62, 64 is connected through the individual conduit 44 to the hydraulic chamber 28 of the shock absorber 14 for the rear left wheel, and the opposed two inner pressure-receiving surfaces 86, 88 of the second and third pistons 62, 64 receive a hydraulic pressure in the shock absorber 14. A force based on the hydraulic pressure acting on the inner pressure-receiving surface 86 of the comparatively large second piston 62 acts in the left direction, while a force based on the hydraulic pressure acting on the inner pressure-receiving surface 88 of the comparatively small third piston 64 acts in the right direction. Therefore, the third hydraulic chamber 74 of the piston assembly 50 has an effective pressure-receiving surface area which receives the hydraulic pressure acting on the piston assembly 50 in the left direction and which is equal to the area of the pressure-receiving surface 86 of the second piston 62 minus the area of the pressure-receiving surface 88 of the third piston 64.

Thus, the piston assembly 50 receives a force acting thereon in the right direction, which is a product of the hydraulic pressure in the second hydraulic chamber 72 and the above-described effective pressure-receiving surface area (that is equal to the area of the pressure-receiving surface 84 of the second piston 62 minus the area of the pressure-receiving surface 82 of the first piston 60), and a force acting thereon in the left direction, which is a product of the hydraulic pressure in the third hydraulic chamber 74 and the above-described effective pressure-receiving surface area (that is equal to the area of the pressure-receiving surface 86 of the second piston 62 minus the area of the pressure-receiving surface 88 of the third piston 64).

Since the first and third pistons 60, 64 have the same diameter, the second and third hydraulic chambers 72, 74 of the piston assembly 50 have the same effective pressure-receiving surface area. In the present embodiment, the diameter of the second piston 62 is determined such that the effective pressure-receiving surface area of the second and third hydraulic chambers 72, 74 is equal to the pressure-receiving surface area of the first and fourth hydraulic chambers 70, 74, that is, equal to the area of the pressure-receiving surfaces 80, 90 of the first and third pistons 60, 64.

The hydraulic pressure in the hydraulic chamber 28 of each of the four shock absorbers 10-16, which is connected to the corresponding one of the first through fourth hydraulic chambers 70-76, is increased when a distance between the wheel-side member 20 and the chassis-side member 22 is increased. In the present embodiment, in which the damping force is larger during expansion of each shock absorber 10-16 as a result of increase in the distance between the wheel-side and chassis-side members 20, 22, than during contraction of each shock absorber 10-16 as a result of decrease in the distance between the members 20, 22, it is possible to more effectively control the damping force where the controller cylinder 48 is connected to the hydraulic chamber 28 as in the present embodiment, than in an arrangement in which the controller cylinder 48 is connected to the hydraulic chamber 30.

Figure 2:
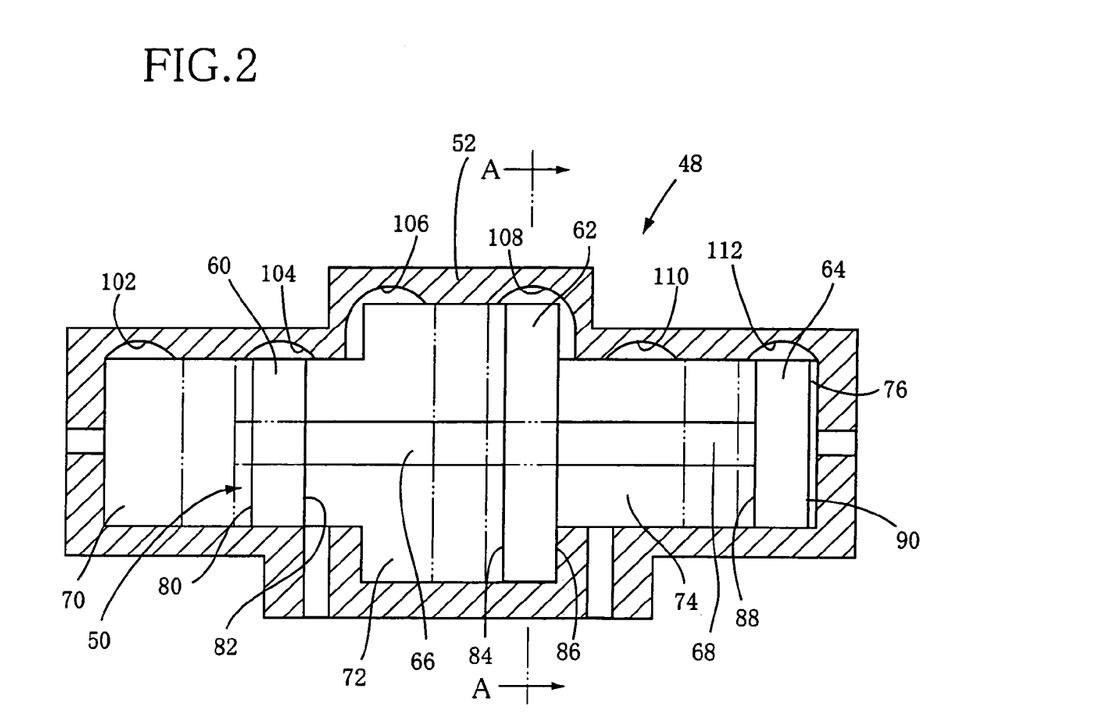
FIG. 2 is a front view in cross section of a controller cylinder in the vehicle suspension system of FIG. 1.
Figure 3:
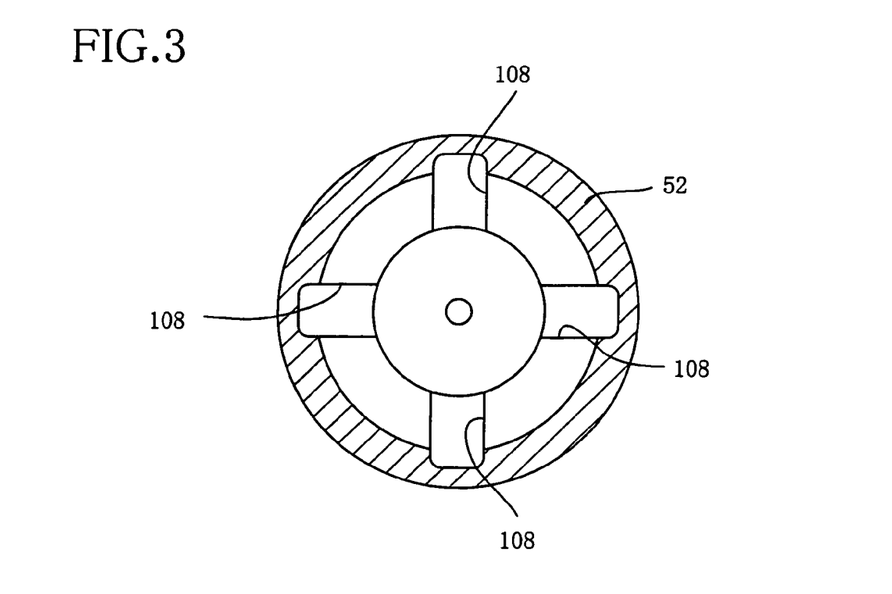
FIG. 3 is a cross sectional view taken along line A-A of FIG. 2.
Figure 4:
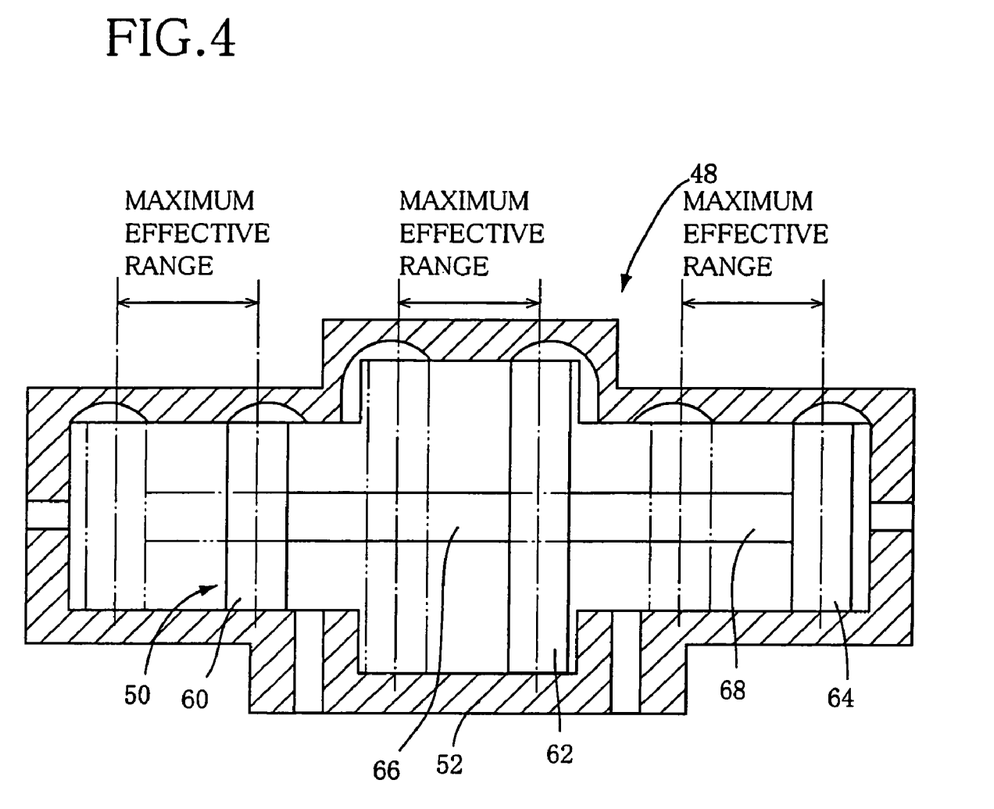
FIG. 4 is a view for explaining functions of the controller cylinder of FIG. 2.

In the present vehicle suspension system constructed as described, the controller cylinder 48 is provided with a suspension-cylinder operation facilitator that is operable to facilitate an operation of each of the shock absorbers 10-16 after the piston assembly 50 has reached vicinity of either one of its stroke ends, for enabling displacement of the wheel-side members 20 relative to the chassis-side member 22 even after the piston assembly 50 has reached its stroke end. As shown in FIG. 2 that is a cross sectional view of the controller cylinder 48, communication grooves 102, 104, 106, 108, 110, 112 are formed in respective portions of an inner circumferential surface of the cylinder housing 52 in which portions the pistons 60, 62, 64 are fitted when the piston assembly 50 is positioned in vicinity of each of its opposite stroke ends. Each of the communication grooves 102-112 has such a length that permits a fluid communication between each adjacent pair of the hydraulic chambers 70-76 as communicable chambers which are located on respective opposite sides of a corresponding one of the pistons 60, 62, 64 when the piston assembly 50 is positioned in the vicinity of either one of its stroke ends. That is, with the piston assembly 50 being positioned in the vicinity of either one of its stroke ends, each adjacent pair of the hydraulic chambers 70-76 are held in communication with each other via the corresponding communication grooves 102-112, whereby the working fluid is allowed to flow from one of the adjacent hydraulic chambers toward the other of the adjacent hydraulic chambers. It is noted that, although the cylinder housing 52 is actually constituted by a plurality of members or pieces due to convenience of its manufacturing, the housing 52 is illustrated as if it were provided by a single piece since it functions as the single piece after being assembled.

An operation of the vehicle suspension system constructed as described above will be described. The piston assembly 50 receives a force based on the hydraulic pressure in the hydraulic chamber 28 of the shock absorber 10 for the front left wheel (a force represented by a product of the hydraulic pressure in the first hydraulic chamber 70 and the area of the outer pressure-receiving surface 80), a force based on the hydraulic pressure in the hydraulic chamber 28 of the shock absorber 16 for the rear right wheel (a force represented by a product of the hydraulic pressure in the second hydraulic chamber 72 and the effective pressure-receiving surface area of the chamber 72), a force based on the hydraulic pressure in the hydraulic chamber 28 of the shock absorber 12 for the front right wheel (a force represented by a product of the hydraulic pressure in the fourth hydraulic chamber 76 and the area of the outer pressure-receiving surface 90), and a force based on the hydraulic pressure in the hydraulic chamber 28 of the shock absorber 14 for the rear left wheel (a force represented by a product of the hydraulic pressure in the third hydraulic chamber 74 and the area of the effective pressure-receiving surface area of the chamber 74). The vehicle is designed symmetrically on its left and right sides in its mass distribution such that the loads acting on the front left and right wheels are equal to each other, while the loads acting on the rear left and right wheels are equal to each other, in a normal state of the vehicle. Accordingly, the piston assembly 50 is held at a neutral position (that is indicated by two-dot chain line in FIG. 2) in the normal state of the vehicle.

When the vehicle body has a pitching motion, which causes an increase in the distance between the wheel-side and chassis-side members 20, 22 on the front side of the vehicle, and a decrease in the distance on the rear side of the vehicle, as a result of acceleration of the vehicle, for example, the hydraulic pressures in the hydraulic chambers 28 of the shock absorbers 10, 12 for the front left and right wheels are increased, while the hydraulic pressures in the hydraulic chambers 28 of the shock absorbers 14, 16 for the rear left and right wheels are reduced, so that the hydraulic pressures acting on the outer pressure-receiving surfaces 80, 90 are increased, while the hydraulic pressures acting on the inner pressure-receiving surfaces 84, 86 are reduced. The above-indicated symmetrical design of the vehicle maintains the piston assembly 50 at its neutral position even in the event of the pitching motion of the vehicle body, and each shock absorber 10-16 provides a sufficiently large damping force, while restricting a speed of the pitching motion of the vehicle body.

When the vehicle body has a rolling motion, which causes an increase in the distance between the wheel-side and chassis-side members 20, 22 on the left side of the vehicle, and a reduction in the distance on the right side of the vehicle, for example, the hydraulic pressures in the hydraulic chambers 28 of the shock absorbers 10, 14 for the front and rear left wheels are increased, while the hydraulic pressures in the hydraulic chambers 28 of the shock absorbers 12, 16 for the front and rear right wheels are reduced, so that the hydraulic pressures acting on the outer pressure-receiving surface 80 and the inner pressure-receiving surface 86 are increased, while the hydraulic pressures acting on the inner pressure-receiving surface 84 and the outer pressure-receiving surface 90 are reduced. Where the vehicle including the present suspension system is designed such that the hydraulic pressures in the hydraulic chambers 28 of the front left and right shock absorbers 10, 12 are substantially equal to each other, the piston assembly 50 is held stationary at its neutral position even in the event of the rolling motion, and the shock absorbers 10-16 operate as if they were independent of each other, such that each absorber 10-16 provides a sufficiently large damping force according to a relative movement of the wheel-side and chassis-side members 20, 22, while restricting a speed of the rolling motion of the vehicle body.

When one of the shock absorbers 10-16, for example, the shock absorber 10 for the front left wheel is subjected to a force that causes a decrease in the distance between the wheel-side and chassis-side members 20, 22, or when the two shock absorbers for the two diagonally opposed wheels are subjected to forces that cause these two wheels to be moved in the same direction toward or away from the vehicle body, for example, the shock absorbers 10, 16 for the front left and rear right wheels are subjected to forces that cause simultaneous occurrences of a decrease in the distance between the wheel-side and chassis-side members 20, 22 of those two shock absorbers 10, 16, the hydraulic pressures in the hydraulic chambers 28 of the shock absorbers 10, 16 are reduced, while the hydraulic pressures in the hydraulic chambers 28 of the shock absorbers 12, 14 are increased, so that the hydraulic pressures acting on the outer pressure-receiving surface 80 and the inner pressure-receiving surface 84 are reduced, while the hydraulic pressures acting on the inner pressure-receiving surface 86 and the outer pressure-receiving surface 90 are increased. As a result, a force acting on the piston assembly 50 in the left direction as seen in FIG. 1 becomes larger than a force acting on the piston assembly 50 in the right direction, so that the piston assembly 50 is axially moved in the left direction. Consequently, the volumes of the first and second hydraulic chambers 70, 72 are reduced, while the volumes of the third and fourth hydraulic chambers 74, 76 are increased. Accordingly, the hydraulic working fluid is discharged from the shock absorbers 12, 14 into the third and fourth hydraulic chambers 74, 76, while the working fluid is discharged from the first and second hydraulic chambers 70, 72 into the shock absorbers 10, 16. Thus, the vehicle suspension system is operated as if the shock absorbers 10, 16 and the shock absorbers 12, 14 were communicated with each other through the controller cylinder 48, and as if the fluid flowed from the shock absorbers 12, 14 into the shock absorbers 10, 16. Accordingly, a difference between the hydraulic pressures in the hydraulic chambers 28, 30 of each of the shock absorbers 10-16 is reduced, and the velocity of the fluid flow through the flow restrictor 32 is lowered, so that the damping force produced by each shock absorber is reduced. Therefore, each of the wheels can be easily moved toward and away from the vehicle body, and the two diagonally opposed wheels can be easily moved in the upward or downward direction toward or away from the vehicle body, so that a vertical movement of the vehicle body can be effectively restricted.

Thus, the vehicle suspension system according to the present embodiment of the invention provides a sufficiently large damping force upon a rolling or pitching motion of the vehicle body, and a comparatively small damping force upon application of a force to one of the wheels in the vertical direction or forces to the two diagonally opposed wheels in the same upward or downward direction, so that the rolling or pitching motion can be effectively restricted while permitting a smooth vertical movement of one of the wheels or smooth concurrent movements of the two diagonally opposed wheels in the same upward or downward direction. The present suspension system does not require each of the shock absorbers 10-16 to be provided with a control device to control the damping force, for optimizing the damping force depending upon a specific change of attitude of the vehicle body or a specific state of undulation of the roadway surface.

When an operating amount (an amount of expansion or contraction) of the shock absorbers 10-16 is large, the piston assembly 50 disposed in the controller cylinder 48 reaches one of its stroke ends. In this instance, if the suspension-cylinder operation facilitator were not provided in the suspension system, the controller cylinder 48 could not permit flow of the working fluid into or out of the controller cylinder 48, thereby causing the damping force of each of the shock absorbers 10-16 to be abruptly increased, and leading to the consequent deterioration of the ride comfort. However, in the suspension system according to the present embodiment, each adjacent pair of the hydraulic chambers 70-76 which are located on respective opposite sides of a corresponding one of the pistons 60, 62, 64, are brought into communication with each other via the corresponding communication grooves 102-112, before the piston assembly 50 reaches either one of its stroke ends. Therefore, even when a further movement of the piston assembly 50 is made impossible after the piston assembly 50 has reached either one of its stroke ends, the flow of the working fluid into or out of the controller cylinder 48 can be continued. It is therefore possible to maintain the smooth expansion or contraction of each of the shock absorbers 10-16, making it possible to avoid the deterioration of the ride comfort. In the present embodiment, the suspension-cylinder operation facilitator is constituted by the communication grooves 102-112 cooperating to serve as a communication establisher that is operable, when the piston assembly 50 of the controller cylinder 48 is positioned in the vicinity of either one of its stroke ends, to establish a fluid communication between each adjacent pair of the hydraulic chambers 70-76.

As described above, when the piston assembly 50 is positioned in the vicinity of either one of its stroke ends, each adjacent pair of the hydraulic chambers 70-76 located on respective opposite sides of a corresponding one of the pistons 60, 62, 64 are brought into communication with each other through the corresponding communication grooves 102-112. Thus, an axial length of the controller cylinder 48 can be made smaller than in a conventional arrangement, and the reductions in the size and weight of the controller cylinder 48 leads to reductions in the vehicle weight and the vehicle manufacturing cost. Further, since a practical operation range of the piston assembly 50 is smaller than a maximum effective range (i.e., a maximum distance by which the piston assembly 50 can be moved without each adjacent pair of the hydraulic chambers 70-76 being brought into communication with each other via the corresponding communication grooves 102-112), the pitching and rolling motions of the vehicle body can be restrained as in a conventional arrangement with a controller cylinder that is not provided with the communication grooves 102-112.

In the above-described embodiment, the suspension-cylinder operation facilitator is provided by the communication establisher that is operable, when the piston of the controller cylinder is positioned in the vicinity of either one of its stroke ends, to establish communication between two communicable chambers, i.e., each adjacent pair of the hydraulic chambers 70-76 located on respective opposite sides of the corresponding piston 60, 62, 64. The communication establisher that is constituted by the communication grooves 102-112 that are formed in the inner circumferential surface of the cylinder housing 52. Thus, the object of the invention is advantageously achieved by such a simple construction with a low cost. However, the communication establisher may be otherwise constituted. For example, the communication establisher may include: (a) a detector member held by at least one piston of the controller cylinder and operable to detect that the at least one piston is positioned in vicinity of its stroke end; (b) a communication passage formed in the at least one piston, such that two communicable chambers that are located on respective opposite sides of each of at least one of the at least one piston are communicable with each other through the communication passage; (c) a normally closed valve which is disposed in the communication passage and which is open when it is detected by the detector member that the at least one piston has reached the vicinity of its stroke end. In this arrangement, the detector member, communication passage and normally closed valve cooperate to constitute the communication establisher.

There will next be described second through fifth embodiments of the invention. In the following description, the same reference signs as used in the first embodiment will be used to identify the functionally corresponding elements, and redundant description of these elements is not provided. It should be noted that elements of each of the second through fifth embodiments, which are not shown in the drawings, have the same construction as the functionally corresponding elements of the first embodiment.

Figure 5:
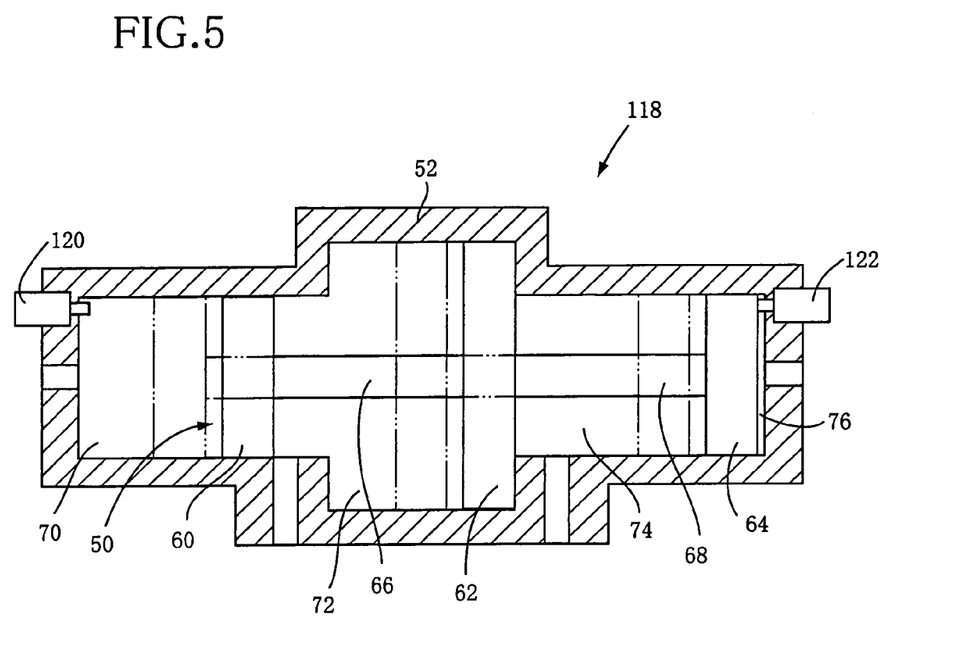
FIG. 5 is a front view in cross section of a controller cylinder in a vehicle suspension system that is constructed according to a second embodiment of the invention.
Figure 6:
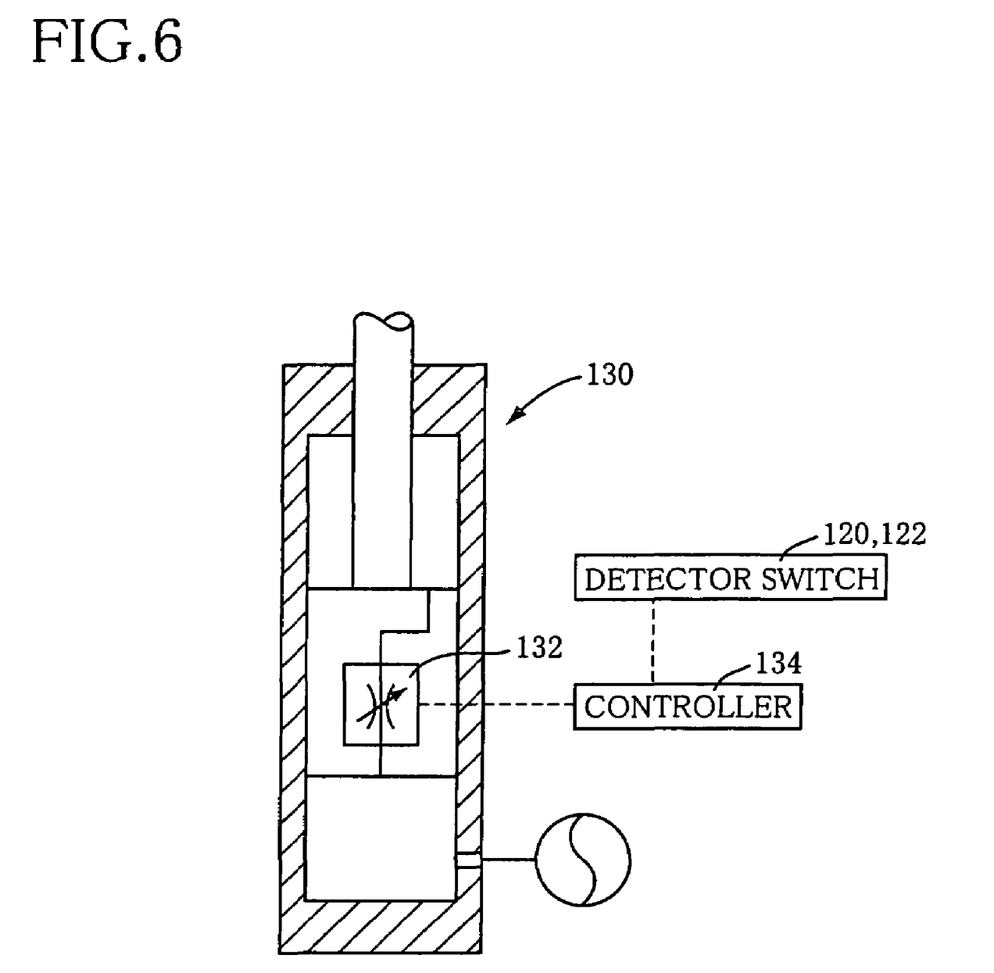
FIG. 6 is a schematic view showing one of shock absorbers and a controller in the vehicle suspension system of FIG. 5.

FIGS. 5 and 6 show a vehicle suspension system constructed according to the second embodiment of the invention. As shown in FIG. 5, a controller cylinder 118 is provided with detectors in the form of detector switches 120, 122 each operable to detect that the piston assembly 50 is positioned in vicinity of a corresponding one of its opposite stroke ends. Meanwhile, as shown in FIG. 6, each of shock absorbers 130 as suspension cylinders is provided with a variable flow restrictor 132, which includes an electric motor as a drive source operable based on an electric signal supplied thereto, to vary a degree of restriction against flow of the working fluid, for thereby controlling the damping force of the shock absorber 130. In this second embodiment, the suspension-cylinder operation facilitator is constituted by, in addition to the detector switches 120, 122 and variable flow restrictor 132, a controller 134 that is operable based on output signals of the switches 120, 122 supplied thereto, to control the flow restrictor 132.

The suspension system according to the this second embodiment is operated in the same manner as in the above-described suspension system according to the first embodiment, while an amount of the movement of the piston assembly 50 of the controller cylinder 118 is small. However, in the suspension system according to this second embodiment, when it is detected by either one of the detector switches 120, 122 that the piston assembly 50 has reached the vicinity of a corresponding one of its stroke ends, the one of the detector switches 120, 122 supplies a signal indicative of that fact, to the controller 134. In response to the supplied signal, the controller 134 causes the variable flow restrictor 132 to reduce the degree of the restriction against the fluid flow, namely, the controller 134 causes the variable flow restrictor 132 to be placed in its low restriction state. While the piston assembly 50 of the controller cylinder 118 is movable without reaching its stroke ends, a smooth vertical movement of each wheel is allowed, for example, in the event where one of the wheels runs over a raised portion of a roadway surface, or in the event of "in-phase movement of diagonally opposite wheels", even where the variable flow restrictor 132 is placed in its high restriction state for causing the shock absorber to exhibit a relatively large damping force. However, when the piston assembly 50 has reached either one of its stroke ends, namely, when the controller cylinder 118 is made inoperable, a smooth vertical movement of at least one of the wheels is not allowed. In this second embodiment in which the variable flow restrictor 132 is placed in its low restriction state, as described above, it is possible to restrain deterioration of the ride comfort.

As is clear from the above description, in the vehicle suspension system according to this second embodiment, each of the four shock absorbers 130 as the suspension cylinders is provided with a damping force changer operable to change the damping force generated by the shock absorber 130. The suspension-cylinder operation facilitator includes, in addition to the damping force changer, a damping force controller in the form of the controller 134 operable in response to the detection by the detector switches 120, 122 as the detectors that the piston assembly 50 has reached the vicinity of either one of its stroke ends, to cause the damping force changer to reduce the damping force. In other words, the controller 134 facilitates the operation of the suspension cylinders, in response to the stroke end detection made by the detectors.

It is noted that the second embodiment may be modified, for example, such that the variable flow restrictor 132 incorporated in each of the shock absorbers 150-156 is replaced with a plurality of accumulators that are arranged to be connectable with the shock absorbers. In this modified arrangement, each of the accumulators is selectively connected and disconnected to and from a corresponding one of the shock absorbers by, for example, an solenoid-operated valve.

In the above-described embodiments, the controller cylinder 48, 118 has the four hydraulic chambers defined by the three pistons 60, 62, 64. However, the present invention is equally applicable to an arrangement as in the above-described U.S. Pat. No. 3,024.037 in which the controller cylinder has the four hydraulic chambers defined by the two pistons and the one partition wall.

Figure 7:
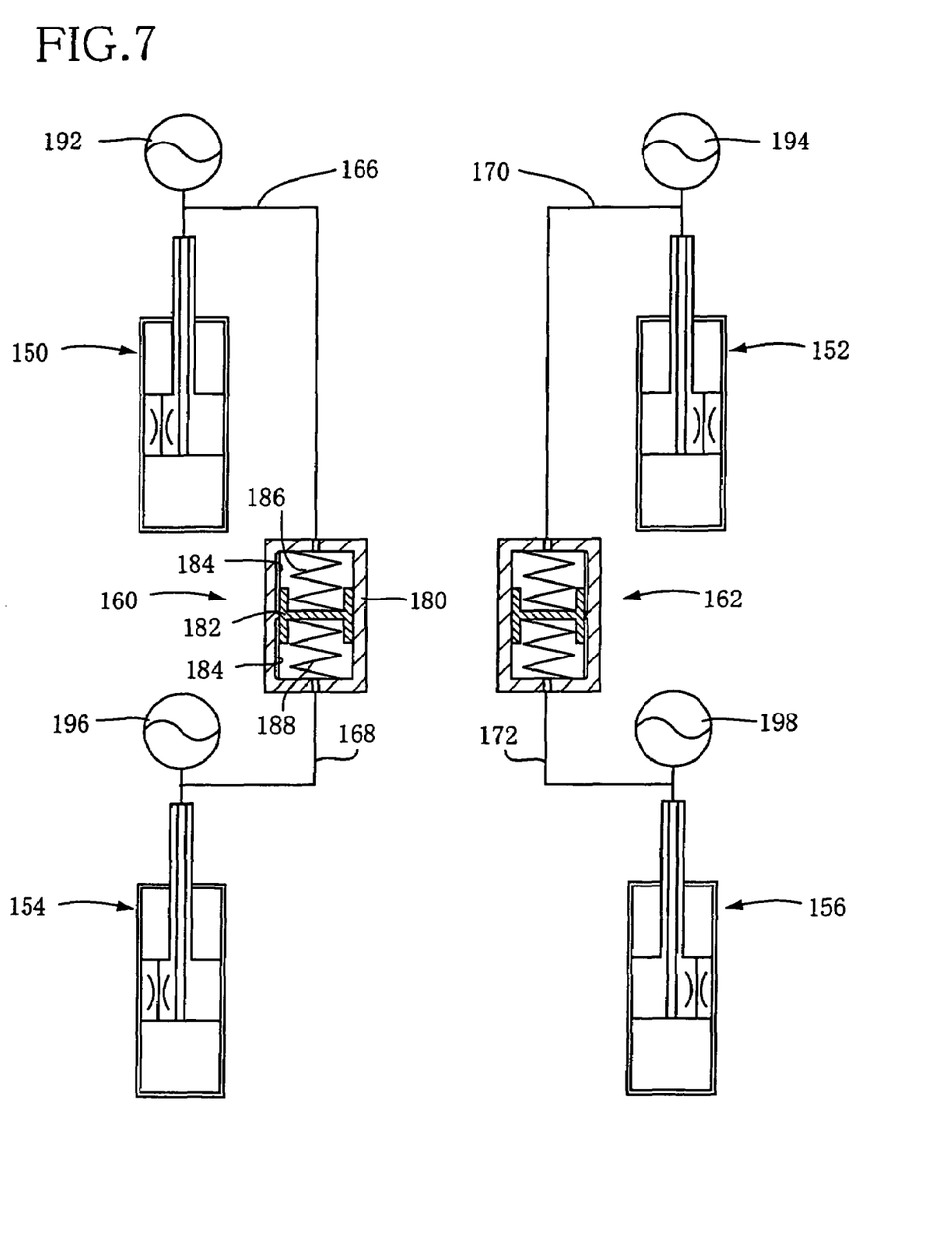
FIG. 7 is a schematic view showing a vehicle suspension system constructed according to a third embodiment of the invention.

FIG. 7 shows a vehicle suspension system constructed according to the third embodiment of the invention in which there are provided two controller cylinders 160, 162 each of which has two hydraulic chambers defined by a single piston. As shown in FIG. 7, shock absorbers 150, 154 provided for respective front left and rear left wheels are connected to each other through the controller cylinder 160 and individual conduits 166, 168, while shock absorbers 152, 156 provided for respective front right and rear right wheels are connected to each other through the controller cylinder 162 and individual conduits 170, 172. Each of the controller cylinders 160, 162 has a cylinder housing 180 and a piston 182. Communication grooves 184 are formed in respective portions of an inner circumferential surface of the cylinder housing 180 in which portions the piston 182 are fitted when the piston 182 is positioned in vicinity of its stroke ends. The piston 182 is normally held in its neutral position by elastic members in the form of compression coil springs 186, 188 that are disposed on respective opposite sides of the piston 182. Further, accumulators 192, 194, 196, 198 are provided to be connected to the respective shock absorbers 150-156.

In the suspension system constructed according to this third embodiment, in event of a rolling motion of the vehicle body, the rolling motion is satisfactorily restrained without activation of the controller cylinders 160, 162, namely, without substantial movement of the piston 182 within the cylinder housing 180 of each of the controller cylinders 160, 162. On the other hand, in the event where one of the wheels runs over a raised portion of a roadway surface, or in the event of "in-phase movement of diagonally opposite wheels", a relatively smooth vertical movement of the wheel or wheels is permitted by activation of at least one of the controller cylinders 160, 162. When the piston 182 reaches the vicinity of either one of its stroke ends in each of the controller cylinders 160, 162, two hydraulic chambers located on respective opposite sides of the piston 182 are brought into communication with each other through the communication groove 184, so that the shock absorbers (communicated with the respective two hydraulic chambers) are brought into communication with each other. Thus, a smooth activation of the shock absorbers 150-156 is permitted even after the piston 182 has reached its stroke end, thereby permitting the controller cylinders 160, 162 to be made more compact in size, than in an arrangement without the communication groove 184. It is noted that this third embodiment may be modified such that each of the shock absorbers 150-156 is replaced with a hydraulic cylinder without a vibration damping function, and such that a fixed or variable flow regulator may be provided in a conduit connecting each shock absorber 150-156 and the corresponding accumulator 192-198.

Figure 8:
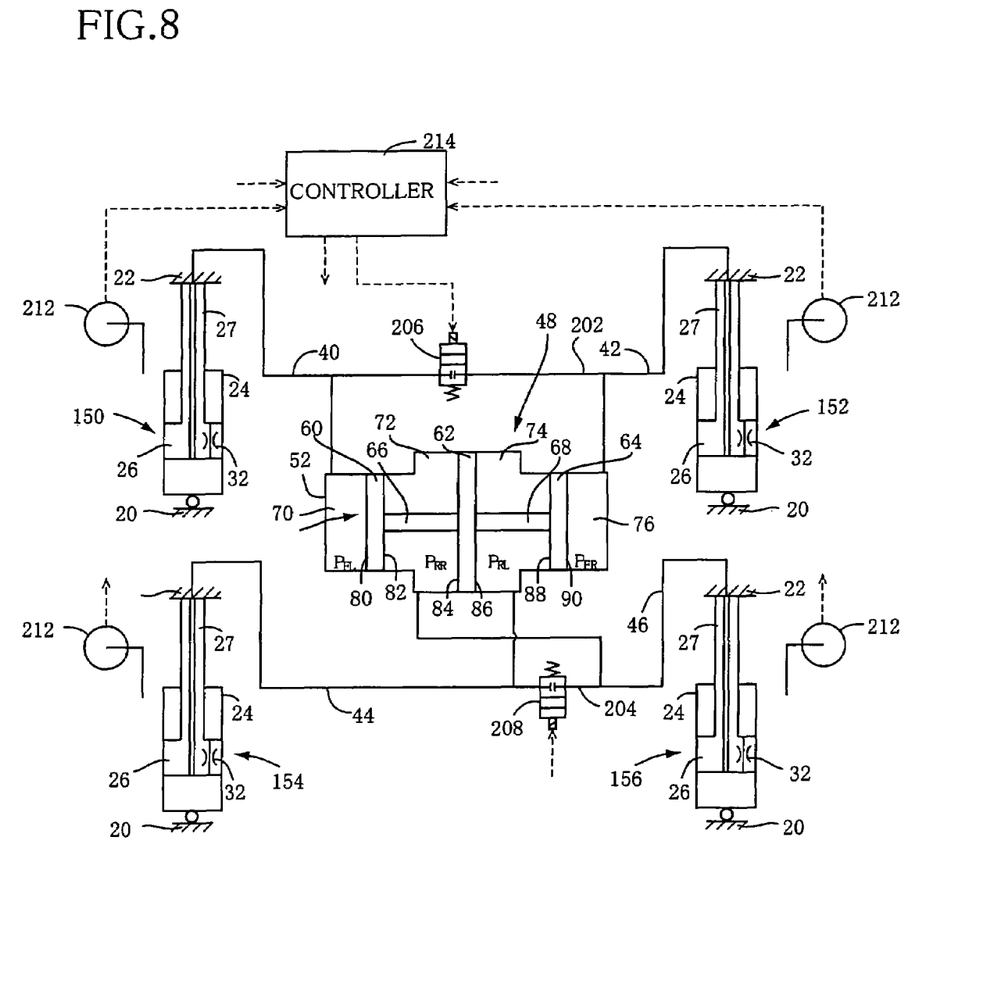
FIG. 8 is a schematic view showing a vehicle suspension system constructed according to a fourth embodiment of the invention.

FIG. 8 shows a vehicle suspension system constructed according to the fourth embodiment of the invention, which includes, in addition to the suspension-cylinder operation facilitator, a detector operable to detect that the piston assembly of the controller cylinder has reached the vicinity of either of its stroke ends, as the suspension system according to the above-described second embodiment. However, the suspension system according to this fourth embodiment is different from the suspension systems according to the above-described first through third embodiments, with respect to constructions of the suspension-cylinder operation facilitator and the detector.

In this fourth embodiment, the four shock absorbers 150, 152, 154, 156 as the suspension cylinders are connected to the controller cylinder 48 through the respective individual conduits 40, 42, 44, 46. Further, the individual conduits 40, 42 are connected to each other through a bypass conduit 202, while the individual conduits 44, 46 are connected to each other through a bypass conduit 204. The bypass conduits 202, 204 are provided with solenoid-operated shut-off valves 206, 208, respectively. Each of the shut-off valves 206, 208 is normally placed in its closed state to close a corresponding one of the bypass conduits 206, 208, and is placed in its open state to open the corresponding bypass conduit 206, 208 when the piston assembly 50 of the controller cylinder 48 has reached the vicinity of either one of its stroke ends. It should be noted that the term "stroke end" is not necessarily interpreted to mean a mechanical stroke end beyond of which the piston assembly 50 is physically unmovable, but may be interpreted to mean also a designed stroke end which is located inside the mechanical stroke end and which is predetermined in designing of the controller cylinder. However, in order to reliably restrain rolling and pitching motions of the vehicle body, there is a requirement that the piston assembly is allowed to be moved within the housing of the controller cylinder by a certain minimum distance. Therefore, for making the controller cylinder compact in size while satisfying such a requirement, it is preferable that the above-described designed stroke end is close to the mechanical stroke end as much as possible, as long as the operation of the suspension system is not impeded. This preferable arrangement is technically significant, particularly, in this fourth embodiment in which it is not directly detected that the piston assembly has reached the vicinity of its stroke ends, and also in the other embodiments of the invention.

In the present fourth embodiment, four vehicle-height sensors 212 are disposed in respective local portions of the vehicle chassis in which the shock absorbers 150-156 are located, so as to detect heights or levels of the respective local portions of the vehicle chassis from a roadway surface. These four vehicle-height sensors 212 cooperate with a controller 214 to detect that the piston assembly 50 of the controller cylinder 48 has reached the vicinity of each of its stroke ends. The position of the piston assembly 50 of the controller cylinder 48 is dependent on the positions of the pistons 26 of the respective shock absorbers 150-156, which correspond to the heights of the respective local portions of the vehicle chassis. Thus, the controller 214 as a stroke end determiner can assume or determine, based on the heights detected by the respective vehicle-height sensors 212, whether the piston assembly 50 has reached the vicinity of each of its stroke ends or not. For example, the piston assembly 50 of the controller cylinder 48 is positioned in an axial center of the cylinder housing 52 in a normal state, in which the vehicle is held stationary on a horizontal roadway surface or vehicle is running straight on a horizontal roadway surface at a constant velocity, while the heights of the respective local portions of the vehicle chassis are detected by the respective four vehicle-height sensors 212 to have normal values. In the event of occurrence of articulation causing the front left and rear right wheels to be simultaneously moved upwardly, the shock absorbers 150, 156 are caused to contract, whereby the piston assembly 50 is moved in the right direction as seen in FIG. 8 and eventually reaches its right stroke end. In this instance, the vehicle-height sensors 212 detect the heights of the respective local portions of the vehicle chassis which represent the positions of the pistons 26 of the respective shock absorbers 150, 156, and the controller 214 assumes or determines that the piston assembly 50 has reached the vicinity of the right stroke end, on the basis of an amount of change of the height of the local portions detected by the vehicle-height sensors 212.

Upon determination that the piston assembly 50 has reached the vicinity of the stroke end, the controller 214 permits an electric current to be supplied to the solenoid-operated shut-off valves 206, 208, whereby the shut-off valves 206, 208 are placed in their respective open states, so that the front left and rear right wheels can continue to be smoothly moved upwardly even after the piston assembly 50 has stopped at the mechanical stroke end. If the shut-off valves 206, 208 were held in their closed states after the above-described determination, namely, if the bypass conduits 202, 204 were held closed after the determination, the upward movement of the front left and rear right wheels would be strongly restrained due to the damping effect of the flow restrictors 32 of the shock absorbers 150, 156. In the vehicle suspension system according to this fourth embodiment of the invention, the controller cylinder 48 can be provided by a small-sized cylinder permitting a relatively short stroke of the piston assembly 50, while each wheel can be vertically moved by a sufficiently large distance. It is therefore possible to obtain the vehicle suspension system suitable for, particularly, a vehicle designed for running on a poor-conditioned or rough roadway surface. It is noted that the solenoid-operated shut-off valves 206, 208 may be placed in the open states also in the normal state of the vehicle, so that the hydraulic pressures in the shock absorbers 150, 152 for the front left and right wheels can be equalized to each other, and the hydraulic pressures in the shock absorbers 154, 156 for the rear left and right wheels can be equalized to each other.

As is apparent from the above description, in the fourth embodiment, each of the solenoid-operated shut-off valves 206, 208 serves as a connection controller, and the shut-off valves 206, 208 cooperate with the bypass conduits 202, 204 to constitute the suspension-cylinder operation facilitator. Further, the controller 214 serves as a stroke end determiner operable to determine or assume, based on the heights detected by the vehicle-height sensors 212, that the piston assembly 50 has reached the vicinity of each of its stroke ends. The controller 214 cooperates with the vehicle-height sensors 212 to constitute the detector operable to detect that the piston assembly 50 has reached the vicinity of each of its stroke ends. It is noted that, where a rolling or pitching moment acts on the vehicle body, the hydraulic pressures acting on the piston assembly 50 of the controller cylinder 48 in the respective opposite axial directions are substantially equalized to each other. In such a case with the rolling or pitching moment acting on the vehicle body, a large damping force is generated in each of the shock absorbers 150-156, with the piston assembly 50 of the controller cylinder 48 being held substantially stationary in its neutral position, whereby a rolling or pitching motion of the vehicle body can be satisfactorily restrained.

In the fourth embodiment, the solenoid-operated shut-off valves 206 as the connection controller is provided in the bypass conduit 202, which is provided to connect the shock absorbers 150, 152 for the front left and right wheels, bypassing the controller cylinder 48. Similarly, the solenoid-operated shut-off valves 208 as the connection controller is provided in the bypass conduit 204, which is provided to connect the shock absorbers 154, 156 for the rear left and right wheels, bypassing the controller cylinder 48. However, the bypass conduits 202, 204 may be replaced by bypass conduits, one of which connects the shock absorbers 150, 154 for the front left and rear left wheels, and the other of which connects the shock absorbers 152, 156 for the front right and rear right wheels, such that the connection controllers are provided in the respective bypass conduits bypassing the controller cylinder 48. In other words, a bypass conduit bypassing the controller cylinder is provided to connect two suspension cylinders which cause the fluid pressures to act on the at least one piston of the controller cylinder in respective directions opposite to each other, and the bypass conduit is provided with the connection controller such as a shut-off valve which is arranged to normally close the bypass conduit and to open the bypass conduit when the piston of the controller cylinder has reached in the vicinity of its stroke end. It is noted that the term "causing the hydraulic pressures to act on the at least one piston of the controller cylinder in respective directions opposite to each other" which is used herein, is interpreted to mean "causing the hydraulic pressure to act on a single piston in respective directions opposite to each other" where the at least one piston consists of the single piston, and also to mean "causing the hydraulic pressure to act on a piston assembly in respective directions opposite to each other" where the at least one piston consists of the piston assembly as in the fourth embodiment.

Figure 9:
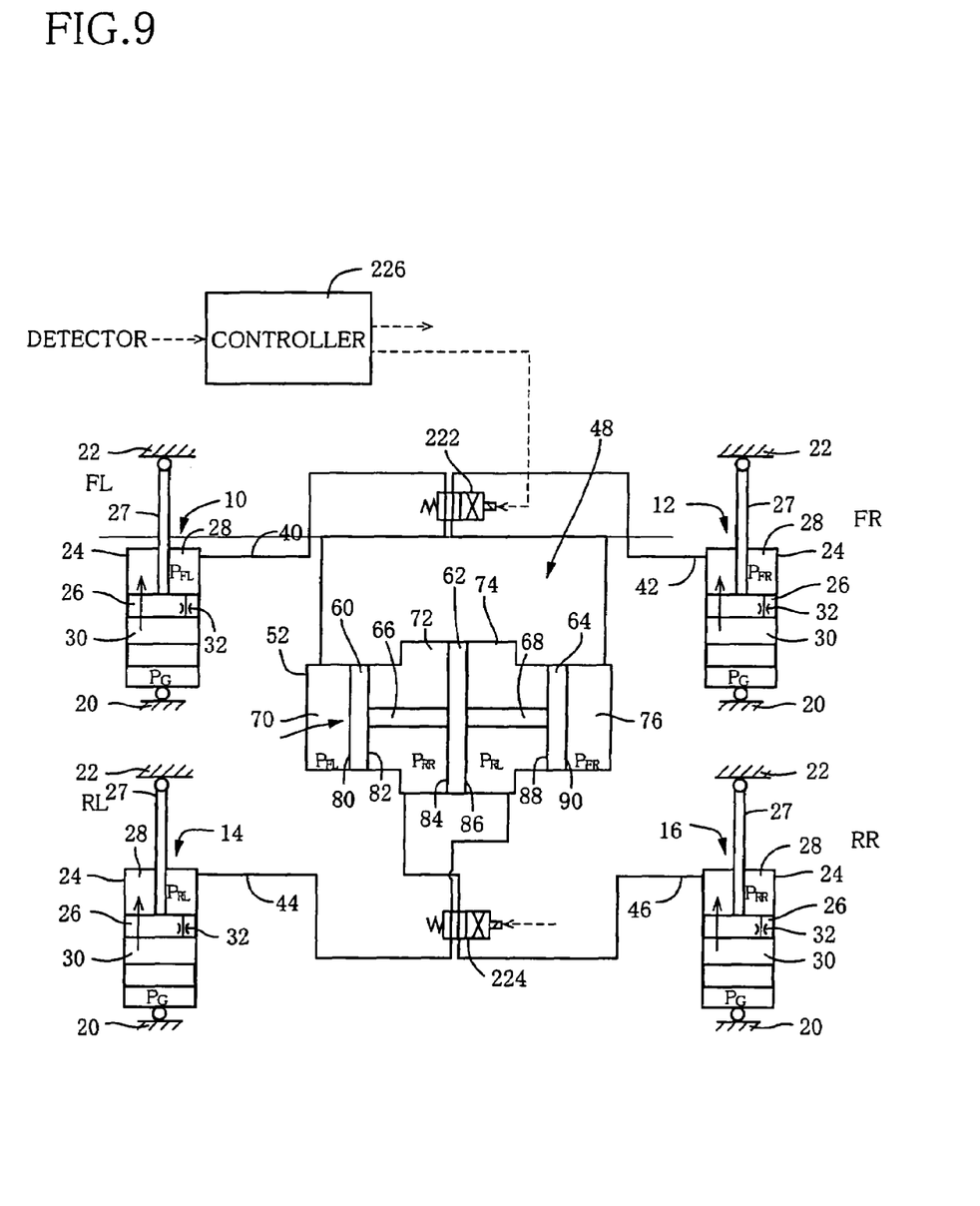
FIG. 9 is a schematic view showing a vehicle suspension system constructed according to a fifth embodiment of the invention.

FIG. 9 shows a vehicle suspension system constructed according to the fifth embodiment of the invention, which is different from the system according to the above-described first embodiment, in that there is additionally provided the detector operable to detect that the piston assembly 50 of the controller cylinder 48 has reached the vicinity of each of its stroke ends, and in that the suspension-cylinder operation facilitator is provided by solenoid-operated directional control valves 222, 224 and a controller 226 operable to control the valves 222, 224. The detector may be the same as the detector (see FIG. 5) in the second embodiment or as the detector (see FIG. 8) in the fourth embodiment.

In the vehicle suspension system according to this fifth embodiment, in the event of occurrence of articulation causing the front left and rear right wheels to be simultaneously moved upwardly, namely, in the event that the piston assembly 50 is caused to reach its left stroke end as seen in FIG. 9, in response to a detection of that fact, which is made by the detector, the controller 226 allows an electric current to be supplied to each of the solenoid-operated directional control valves 222, 224. With the electric current being supplied thereto, each of the valves 222, 224 is switched from its first position (normal or de-energized state as shown in FIG. 9) to its second position (energized state), thereby changing a direction of flow of the working fluid which has flowed from the controller cylinder 48 toward the shock absorbers 10, 16 and which caused the piston assembly 50 to be moved in the left direction, so that the piston assembly 50 is forced based on the changed direction of flow of the working fluid, to be moved in the right direction. Since the rightward movement of the piston assembly 50 from its left stroke end is allowed, the shock absorbers 10, 16 are permitted to continue contracting. When the piston assembly 50 has reached the vicinity of its right stroke end, in response to a detection of that fact, the controller 226 suspends the supply of the electric current to each of the solenoid-operated directional control valves 222, 224, whereby each of the valves 222, 224 is switched back to its first position (as shown in FIG. 9), thereby causing the piston assembly 50 to be moved in the left direction again. That is, in the present fifth embodiment, each of the solenoid-operated directional control valves 222, 224 is alternately energized and de-energized as needed, whereby the shock absorbers 10, 16 can continue contracting in an infinite manner, until the pistons 26 reach their mechanical stroke ends. Thus, in the vehicle suspension system according to this fifth embodiment, too, the controller cylinder 48 can be provided by a small-sized cylinder permitting a relatively short stroke of the piston assembly 50, while each wheel can be vertically moved by a sufficiently large distance. It is noted that the switching of the operating state of each of the solenoid-operated directional control valves 222, 224 does not necessarily have to be done twice or more. Even where the switching of the operating state of each valve 222, 224 is made only once, the effect of the present invention can be obtained.

The arrangement of a switcher such as the solenoid-operated directional control valves 222, 224 is not limited to the details as described above, but may be modified as needed, as long as the switcher is operable to selectively establish a first state in which one of two suspension cylinders (which supply the fluid pressures acting on the at least one piston of the controller cylinder in respective directions opposite to each other) is connected to one of two hydraulic chambers of the controller cylinder while the other of the two suspension cylinders is connected to the other of the two hydraulic chambers, and a second state in which the one of the two suspension cylinders is connected to the other of the two chambers while the other of the two suspension cylinders is connected to the one of the two chambers.

Each of the above-described connection controller and switcher does not necessarily have to be provided by a solenoid operated valve, but may be provided by, for example, a pilot-operated valve or a mechanically operated valve that includes a mechanism mechanically operated, upon positioning of the at least one piston in the vicinity of its stroke end, to switch its operating state. Further, each of the valves may be provided by combination of a plurality of valve devices such as two shut-off valves that can be provided in place of the directional control valve.

In the five embodiments described above, each of the suspension cylinders is provided by the shock absorber having a damper such as the flow restrictor provided in its piston. However, each suspension cylinder may be provided by a hydraulic cylinder not having a damper provided in its piston. In that case, the hydraulic cylinder may be or may not be equipped with an absorbing function that is provided by, for example, an arrangement in which the hydraulic cylinder is connected to an accumulator through a damper. Further, the controller cylinder may be connected to an external-force applier operable to apply an external force to the controller cylinder so as to control the operation of the controller cylinder.

It is further noted that the term "suspension-cylinder operation facilitator", which has been used in the foregoing description, may be interpreted to mean an operational-characteristic-change restrainer that is operable to avoid or restrain change in operational characteristics of each suspension cylinder after the at least one piston of the controller cylinder has reached its stroke end, namely, such that the operational characteristics of each suspension cylinder is maintained as the same as before the piston reaches its stroke end, or is not substantially changed.

It is to be understood that some elements of each of the above-described embodiments may be replaced, as needed, with the functionally corresponding elements of the other embodiment, and that the present invention may be embodied with various changes and modifications, which may occur to those skilled in the art.

What is claimed is:

1. A vehicle suspension system for a vehicle having a chassis and axles that carry wheels, said system comprising:
    a plurality of suspension cylinders each disposed between
        a chassis-side member connected to the chassis and a corresponding one of a plurality of wheel-side members connected to the axles carrying the wheels;
    a controller cylinder including a housing and at least one piston slidably mounted in said housing, such that said housing and said at least one piston cooperate to define a plurality of chambers each having a volume that is variable upon slide movement of said at least one piston relative to said housing;
    individual conduits each communicating a corresponding one of said plurality of chambers of said controller cylinder and a chamber of a corresponding one of said plurality of suspension cylinders; and
    a suspension-cylinder operation facilitator operable to facilitate an operation of each of said plurality of suspension cylinders for permitting displacement of each of the plurality of wheel-side members relative to the chassis-side member after said at least one piston of said controller cylinder has reached a stroke end thereof.

2. The vehicle suspension system according to claim 1,
    wherein said plurality of chambers of said controller cylinder include two communicable chambers that are located on respective opposite sides of each of at least one of said at least one piston of said controller cylinder,
    and wherein said suspension-cylinder operation facilitator includes a communication establisher operable, when said at least one piston of said controller cylinder is positioned in vicinity of said stroke end thereof, to establish communication between said two communicable chambers.

3. The vehicle suspension system according to claim 2, wherein said communication establisher includes a groove formed in an inner surface of said housing, such that said two communicable chambers are brought into communication with each other via a communication passage defined by said groove when said at least one piston of said controller cylinder is positioned in vicinity of said stroke end thereof.

4. The vehicle suspension system according to claim 1,
    wherein said plurality of suspension cylinders includes two suspension cylinders operable to supply fluid pressures into said plurality of chambers of said controller cylinder such that the fluid pressures supplied from the respective two suspension cylinders act on said at least one piston in respective directions opposite to each other,
    and wherein said suspension-cylinder operation facilitator includes (i) a bypass conduit which bypasses said controller cylinder and which connects said two suspension cylinders, and (ii) a connection controller which opens said bypass conduit when said at least one piston of said controller cylinder is positioned in vicinity of said stroke end thereof, and which closes said bypass conduit when said at least one piston of said controller cylinder is not positioned in vicinity of said stroke end thereof.

5. The vehicle suspension system according to claim 1,
    wherein said plurality of suspension cylinders includes two suspension cylinders which are connected to respective two of said plurality of chambers of said controller cylinder such that fluid pressures supplied into said respective two chambers from the respective two suspension cylinders act on said at least one piston in respective directions opposite to each other,
    wherein said suspension-cylinder operation facilitator includes a switcher operable to selectively establish a first state in which one of said two suspension cylinders is connected to one of said two chambers while the other of said two suspension cylinders is connected to the other of said two chambers, and a second state in which said one of said two suspension cylinders is connected to said other of said two chambers while said other of said two suspension cylinders is connected to said one of said two chambers, and wherein said switcher establishes one of said first and second states that is selected depending upon whether said at least one piston of said controller cylinder has reached vicinity of said stroke end thereof or not.

6. The vehicle suspension system according to claim 1, wherein said suspension-cylinder operation facilitator includes a detector operable to detect that said at least one piston of said controller cylinder is positioned in vicinity of said stroke end thereof, and wherein said suspension-cylinder operation facilitator is operated, when it is detected by said detector that said at least one piston of said controller cylinder has reached vicinity of said stroke end thereof to facilitate the operation of each of said plurality of suspension cylinders.

7. The vehicle suspension system according to claim 6, wherein said suspension-cylinder operation facilitator includes: a damping force changer operable to change a damping force generated by at least one of said plurality of suspension cylinders; and a damping force controller operable, when it is detected by said detector that said at least one piston of said controller cylinder has reached the vicinity of said stroke end thereof, to cause said damping force changer to reduce said damping force.

8. The vehicle suspension system according to claim 6, wherein said detector includes: a height sensor operable to detect a height of a portion of the vehicle chassis in which each of at least one of said plurality of suspension cylinders is located; and a stroke end determiner operable to determine, based on said height detected by said height sensor, whether said at least one piston of said controller cylinder has reached the vicinity of said stroke end thereof or not.

9. The vehicle suspension system according to claims 1, wherein said suspension-cylinder operation facilitator includes a communication establisher operable, when said at least one piston of said controller cylinder is positioned in vicinity of said stroke end thereof, to establish communication between two communicable chambers from among said plurality of chambers.

* * * * *